Aug. 6, 1957  G. NOMARSKI ET AL  2,801,570
MIRROR TYPE OPTICAL OBJECTIVES FOR MICROSCOPES
Filed May 25, 1953  4 Sheets-Sheet 1

Inventors:
Georges Nomarski
Pierre Rousseau
By Allen + Allen attys

Aug. 6, 1957  G. NOMARSKI ET AL  2,801,570
MIRROR TYPE OPTICAL OBJECTIVES FOR MICROSCOPES
Filed May 25, 1953  4 Sheets-Sheet 2
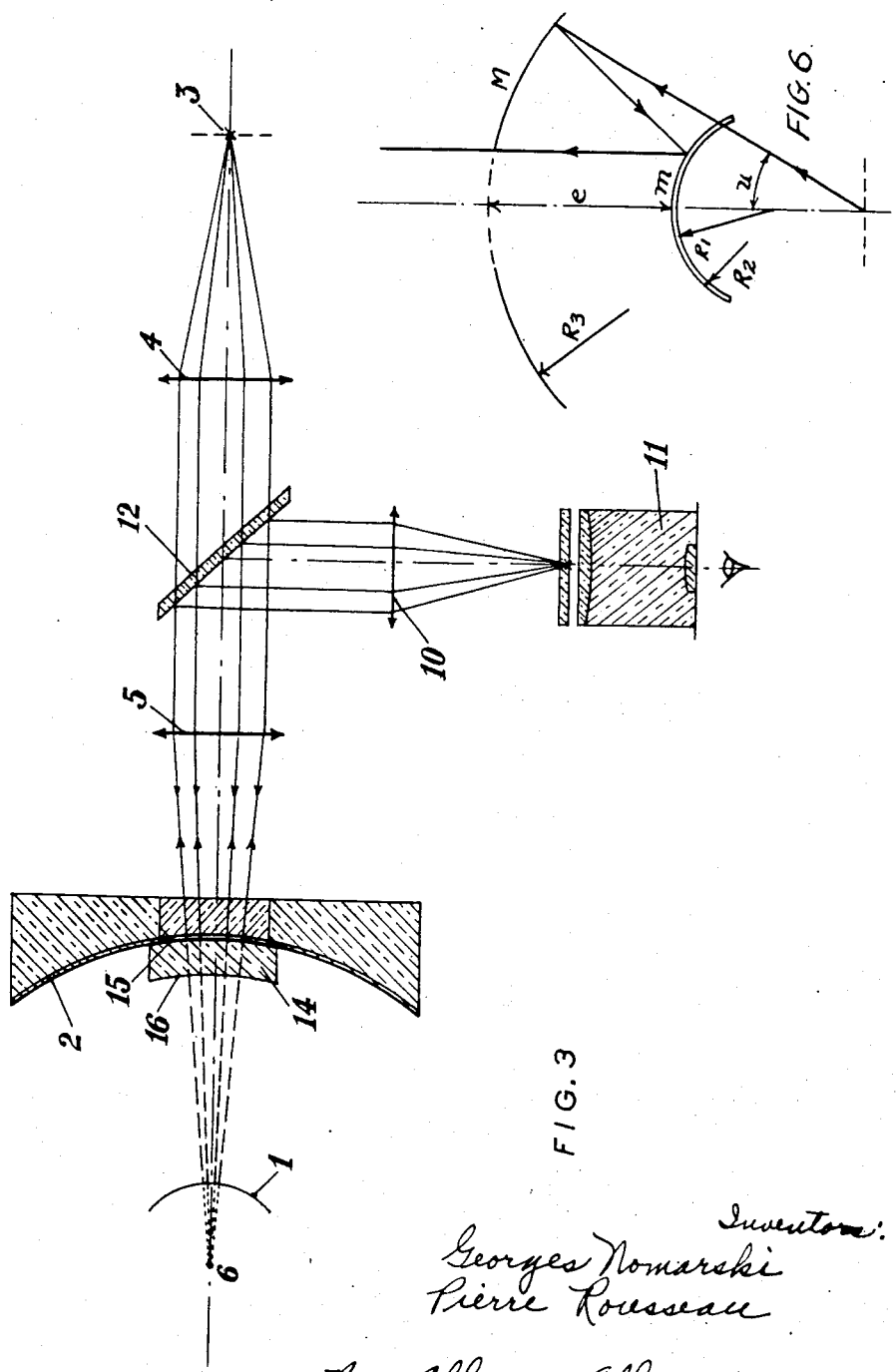

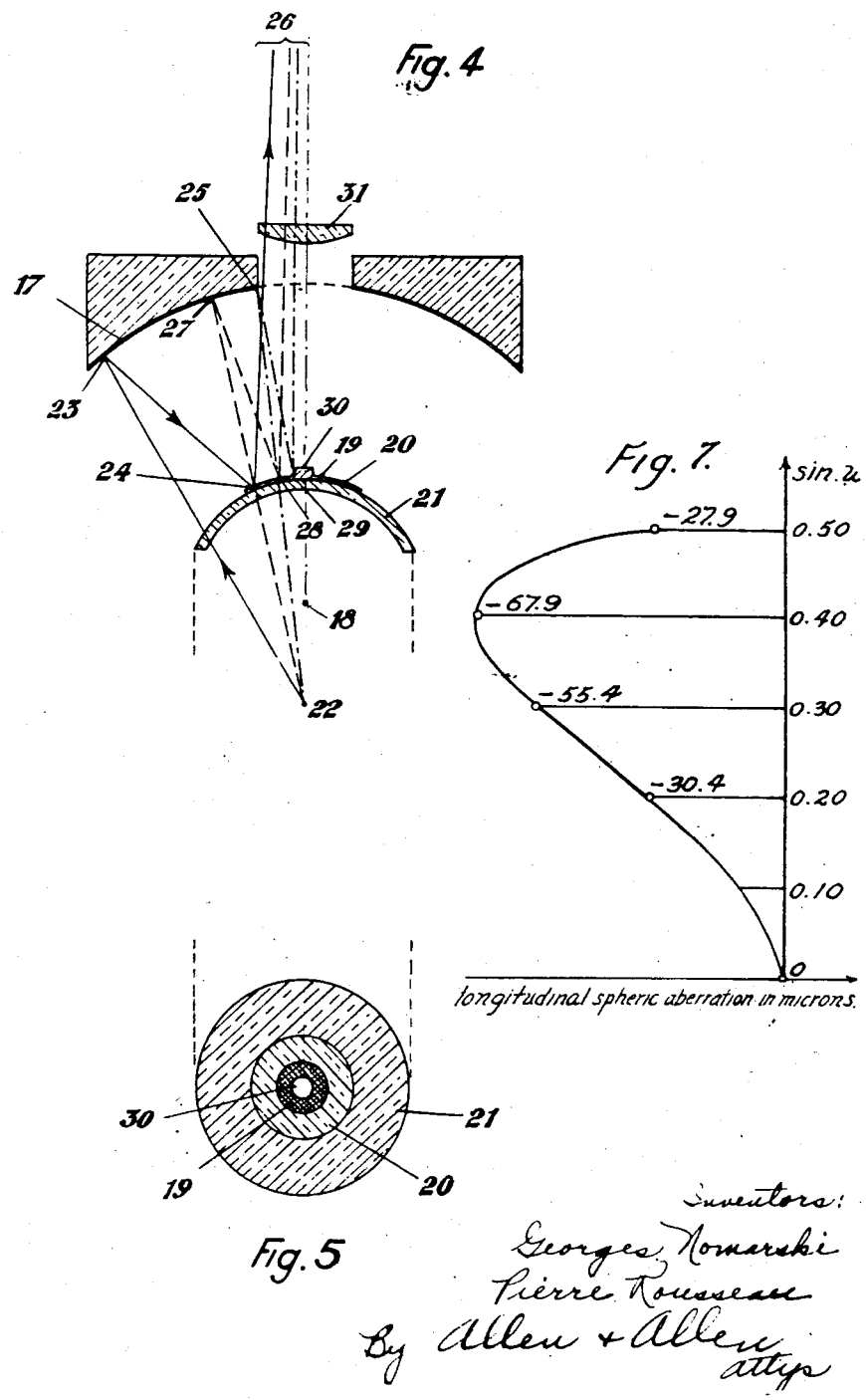

longitudinal spheric aberration - in microns.

United States Patent Office 2,801,570
Patented Aug. 6, 1957

2,801,570

MIRROR TYPE OPTICAL OBJECTIVES FOR MICROSCOPES

Georges Nomarski, Paris, and Pierre Rousseau, Poissy, France, assignors to Centre National de la Recherche Scientifique, Paris, France, a corporation of France Application May 25, 1953, Serial No. 357,214

Claims priority, application France May 29, 1952

4 Claims. (Cl. 88—57)

Microscopes have been known, for a long time, using a mirror optical system instead of conventional refracting elements. As early as 1738 Smith described such a microscope (see "The Microscope" by W. B. Carpenter, edited by Churchill, London).

Research work in this field recently assumed a new importance due to the fact that mirror-type microscopes, in addition to their obvious qualities of achromatism, are particularly well adapted for infra-red or ultra violet observation. Research work was carried on along two main lines, illustrated particularly by the work of Burch in England and Gray in America.

Burch applied the principle of Schwarzschild's aplanatic telescope to a microscope objective. It becomes necessary, then, to use non-spherical surfaces, the cost of which is very high and practically prohibits construction on a production basis.

The catadioptric systems of the type designed by Gray use lenses associated with mirrors for correcting aberrations and obtaining high grade objectives. The interest of such devices is limited by the use of transparent materials in which it is impossible to entirely eliminate dispersion and which narrow down the working spectral field. It is known, already, that it is impossible to obtain a very good correction of images by means of mirrors having spherical surfaces and without any correcting lenses. Spherical aberration can then easily be reduced to a value equal to that tolerated in the best dioptric objectives.

In a system with no central obturation and consequently using the entire aperture, a calculation shows that the optimum conditions are obtained when the marginal focus coincides exactly with the paraxial focus; such arrangements are common at the present time.

In the case of mirror-type microscope objectives, however, one of the mirrors stops the central portion of the beam and the pupil of the instrument is annular. The image of a luminous point in such a system differs widely from the diffraction spot of Airy. A very simple diffraction calculation shows that the relative contrast loss in the image of a point object caused by a central obturation is equal to the ratio of the area obturated at the center of the pupil, to the area of the latter. Thus, it may be said that the effect of a black screen at the center of the aperture of an optical system is equivalent, in its results, to an additional aberration. Consequently, in a mirror system, it is compulsory to decrease the spherical aberration below the value which would be acceptable in a dioptric system having the same maximum aperture. A correct calculation, therefore, should take into account the combined effects of diffraction and geometrical aberrations.

In all cases, present means do not make it possible to easily obtain in a reliable manner the necessarily very accurate centering of the various elements which constitute the system.

In these devices, the central portion of the light beam is necessarily obturated, and obturation may reach 20% of the total effective area. This causes an alteration in the image contrasts due to diffraction phenomena; the image quality is bound with the aberration rate $t$, which is given by $$t = \frac{\sin U_0}{\sin U}$$

where $U$ is the half angle of the maximum object-angular aperture and $U_0$ the half angle of angular aperture obturated by the secondary mirror.

For improving the contrast and fidelity of the image, there is an interest, therefore, in decreasing as much as possible the aberration rate $t$.

The present invention concerns improvements in mirror type microscopes. Its object is a means for improving the image more especially for decreasing spherical aberration, for allowing a rapid and perfect centering of the reflecting surface in the microscope and for decreasing the abberation rate.

Finally, the present invention, covers, by way of novel industrial products, instruments comprising at least one of the following means for a practical embodiment.

The present invention for reducing sperical aberration, improving the centering and decreasing the aberration rate of reflecting surfaces in mirror-type microscopes, comprising an objective with two concentric, spherical or substantially spherical mirrors, one a concave mirror (or main mirror) with a central aperture allowing the passage of the reflected rays onto the other mirror (or secondary mirror) which is convex, is remarkable in that, on the one hand, the curvature radii of the mirrors are given such values that the foci for radii from the outer and inner edges of the annular pupil coincide, on the other hand the coincidence is ensured by auto-collimation, of the mirror centers on the optical axis of the system and finally the effective reflecting surface of the secondary convex mirror is preferably constituted by an opaque, central reflecting zone and a semi-transparent annular reflecting zone surrounding the central zone.

The present invention offers the advantage of decreasing spherical aberrations, ensuring a perfect centering of the mirrors and ensuring a good image structure, the means used being possibly applied, according to needs and to the instruments used, for a simultaneous obtaining or not of these various results.

The present invention will be explained in greater detail hereinafter with reference to the appended drawings which illustrate examples of embodiments and wherein:

Fig. 3 is a diagrammatic sectional view of another example.

Fig. 4 is a sectional view along a plane through the optical axis of an objective according to the invention.

Fig. 5 is a view of the convex mirror as seen along the optical axis.

Fig. 6 is a diagram of the mirror-type objective, assuming the meniscus to be infinitely thin.

Fig. 7 is a curve for the corresponding longitudinal spherical aberration.

In the case of a two-mirror system of the "Cassegrain telescope" type, calculation shows that the optimum conditions are obtained not by having the paraxial focus coincide with the focus for marginal rays but when there is a coincidence of the foci corresponding to rays relative to the two edges of the annular pupil. The correction curve which corresponds to such a coincidence of the foci, is shown in solid line in Fig. 1. The foci $F(h)$ and $F(H)$ which coincide are those relative to the rays going through the pupil at distances $h$ and $H$ from the axis, $h$ and $H$ being the radii which define the annular pupil of the instrument. The light rays corresponding to the shaded portions do not go through the instrument and, therefore, are not involved in the formation of the image. The radii of the two concentric mirrors, respectively convex and concave, of a Cassegrain type objective have here such values that the values of aberration are equal for the two edges of the annular pupil. This mode of correction, according to the invention, makes it possible to decrease by about one half the effect of spherical aberration in a mirror-type microscope with an average aperture.

Taking the example of an objective with two concentric mirrors with radii $R_1=123.6$ and $R_2=319$ with a numerical aperture 0.40. Its focal length is $F=100$; for a point at infinity it is corrected according to the conventional curve (broken line in Fig. 1). By giving $R_2$ the value 318.1 the coincidence is obtained of the foci for the inner and outer marginal rays of the pupil.

In such a mirror-type objective, having a spherical aberration as small as possible, the quality of the image, however, is not perfect when the centers of the mirrors are not exactly on the optical axis of the instrument and when the image structure is not perfect.

Figures 1, 2:
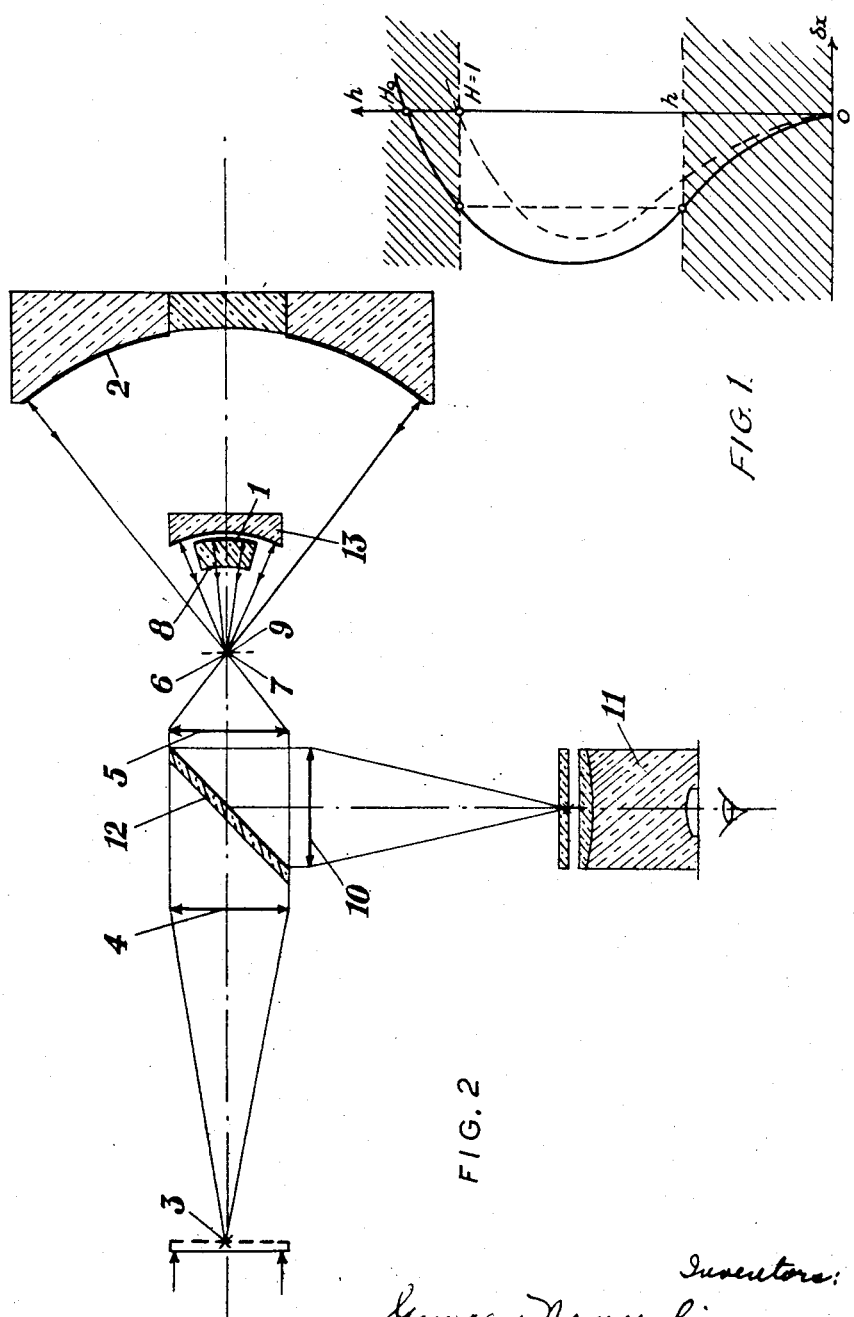
Fig. 1 represents correction curves for known systems and systems in accordance with the present invention.
Fig. 2 is a diagrammatic sectional view of a modification of the centering device.

As represented in the example of Fig. 2, the objective of a microscope consists of two concentric mirrors, a convex mirror 1, and a concave mirror 2. For causing the curvature centers of these mirrors to coincide on the axis of the microscope, the following arrangements are used: the center of a cross wire 3 lit by a source (not shown) is located at the focus of an objective 4. An objective 5 gives an image 6 of this cross-wire 3. A portion of the rays which form this image is then reflected on the rear face of the secondary mirror 1 and forms a first image 7, after having gone through a dioptric element 8 so constructed as to have the same center of curvature as the mirror 1. Another portion of the rays which formed the image 6 is reflected on the main mirror 2 and forms at 9 a second image of the cross wire 3. Said images 7 and 9 are examined by means of a telescope consisting of an objective 10 and an eye-piece 11 using an unsilvered glass plate 12 and the images 7 and 9 are brought into coincidence, which ensures the adjustment. If the aperture of the objective 5 is sufficient, a very accurate adjustment of the mirror-type objective may rapidly be checked or effected.

If it is preferred to effect such an adjustment, still by auto-collimation, but without using the diopter 8 and the back face of mirror 1, it will be sufficient to use a template 13 having the same radius of curvature as the secondary mirror 1, metal plated on its concave face and having a dimension slightly larger than that of the mirror 1. The template being placed in contact with the active surface of the mirror 1, the annular protruding portion of the template is used for checking, as indicated above, the position of the center of curvature of the secondary mirror 1 with respect to that of the center of curvature of the main mirror 2. When the surfaces 1 and 8 are perfectly centered, the concave face of the diopter 8 may be metal-plated and the mirror thus formed may be used for effecting the adjustment.

Figure 3 shows a modification wherein the adjustment by auto-collimation is effected by sighting the common center of the mirrors by means of the auto-collimating device placed on the other side of the system. As in the preceding case, the cross wire 3 is placed at the focus of the objective 4. The rays going through the glass plate 12, then through the objective 5 would form an image at 6, the center of the two mirrors 1 and 2 when the instrument is adjusted. In order to effect the adjustment, however, the central aperture of objective 2 is obturated by a semi-transparent template 14, limited by two spherical diopters 15 and 16 having the same center as the mirrors 1 and 2. The diopter 15 is half metal-plated. In the eye-piece 11 the images are observed of the cross wire 3 which are provided by the semi-metal plated surface 15 of the template 14 on the one hand and by the secondary mirror 1 on the other hand. The adjustment consists in ensuring the coincidence of the two images.

In the modifications represented in Figures 4, 5, 6 and 8, the reflecting and semi-reflecting surfaces of the convex secondary mirror constitute the effective portion of said secondary mirror. They are obtained, practically, by deposits effected on the convex surface of as thin as possible a meniscus lens. This lens represents the necessary support for the reflection and semi-reflecting deposits. It plays no part from the standpoint of correcting the aberrations of the system. In particular, in spite of its shape, it cannot play the part of a Bouwers-Maksutow corrector, and this is obvious since it is placed in the strongly diverging beam. It will be endeavoured, on the contrary, to give the meniscus the smallest possible thickness, so as not to increase the remnant of spherical aberration.

With a mirror thus constituted, the lower limit of angular aperture $U_0$ may be decreased, by using light rays going through the semi-transparent zone in the secondary mirror.

Such as represented schematically in Figure 4, the objective comprises a main mirror 17, which is concave, spherical or substantially spherical and a convex secondary mirror, also spherical or substantially spherical formed of two parts: a spherical cap 19, opaque and reflecting, and a semi-transparent, semi-reflecting ring 20 surrounding the reflecting surface 19; the two mirrors, the main mirror and the secondary mirror, have a common center 22.

The reflecting surfaces 19 and 20 are obtained by means of deposits effected on a meniscus with concentric faces 21. This meniscus of transparent material will be, for instance made of silica, for allowing the use of the objective in the ultra-violet range. The object is placed at 22, a point which is diametrally opposite the apex of the cap 19.

In usual objectives, there is no semi-transparent zone and the surface 20 is opaque and reflecting.

An extreme ray, from the object 22 reaches the mirror 17 at 23, is reflected therein and after reflection on the secondary mirror at 24, passes near the edge 25 of the central aperture for forming an image 26. A ray grazing the edge of the secondary mirror strikes the mirror 17 at 27, is reflected at 28, on the secondary mirror and forms the image 26.

The effective beam issuing from the object 22 occupies the space between two cones, the extreme generatrices of which are 22, 23 and 22—24—27. The diameter of the convex reflecting surface is in fact determined by the radius of maximum aperture 22—23 which, after reflection on 17, reaches the secondary mirror at 24. The whole zone of the mirror 17, comprised between the edge 25 of the central aperture and the cone defined by the generatrices 22—24—27 is not used therefore.

This drawback is obviated by making semi-transparent the zone of the secondary mirror comprised between the cone having the apex 22 and resting on the edge 25 of the central aperture and the cone having the same apex 22 and generated by the rotation, about the axis of the generatrix 22—24—27. Simultaneously, the minimum aperture which, for a usual system, is defined by the angle made with the axis by the ray 22—27, is reduced to the value of the angle made by the ray 22—28—25 with the axis. This defines the reflecting zone 20 and the semi-reflecting zone 21. There ensues an improvement in the quality of the image which amply compensates the loss in luminosity due to the presence of the semi-reflecting surface. The new ray 22—28—25, defining the minimum aperture, reaches the secondary mirror at 29 after reflection on the mirror 17. It then contributes to the formation of the image 26. There is thus defined, at the apex of the cap forming the secondary mirror, a convex portion 30 which is not used, which should be masked by an absorbent screen, especially if the light beam is directed to the object through the optical system itself (case of observation of opaque bodies).

It is recommended to use, as a support for the zones 19 and 20, a meniscus, the faces of which are strictly concentric, so as to facilitate the adjustment by auto-collimation.

If the diverging power of the meniscus is not negligible, it becomes necessary to compensate the chromatic position aberration by means of a convergent lens 31 for instance. Since the numerical aperture associated with the image 26 is generally very low, the spherical aberration due to this addition lens may be neglected. It will be stated, more precisely, that, in the spirit of the invention, the part of the lens 31 is strictly limited to correcting chromatism in the meniscus.

It should be noted that the transmission factor through the instrument for all useful rays remains the same in spite of the discontinuity of the structure of the secondary mirror. All rays included between the extreme rays 22—23 and 22—27 undergo a reflection on the mirror 17, the reflection factor of which is $R_0$, then a reflection between 24 and 28 on the semi-transparent zone 20, the reflection factor of which is $R$. The resultant transmission will be $R_0R$. The rays between 22—24 and 22—28 first go through the zone 20, the factor of transmission of which is $T$, being reflected on the mirror 17 and finally on the opaque zone 19, the reflecting factor of which is equal to that of the mirror 17, i. e. $R_0$. For such rays the resultant transmission will be $R_0^2T$.

We should have $R_0^2T=R_0R$ if $R_0=1$ and $T=R$, which is very close to actual facts. Since however, $R_0$ is slightly less than 1, $R_0$ is made equal to $R_0^2T$ by making the transmission factor slightly larger than the reflection factor $R$ of the semi-reflecting surface 20.

By way of practical example, there is represented in Figure 6 a mode of embodiment wherein the meniscus is assumed to be infinitely thin. The numerical data are as follows:

Numerical aperture: sin $U=0.5$
Focal length: 100
$-R_1=R_2=121$
$-R_3=321$
$e=200$ The aberrations are represented on Figure 7.

Figure 8:
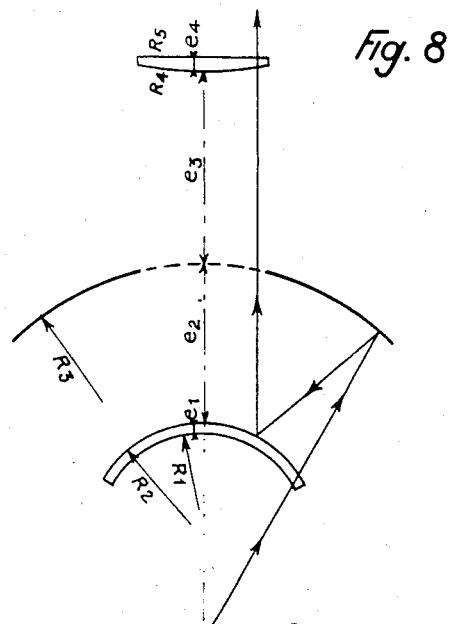
Fig. 8 is a view similar to that of Fig. 6, but relative to the case where the thickness of the meniscus is not negligible.

Figure 8 is relative to the case where the meniscus is not infinitely thin.

The numerical data for the magnitudes represented in the figure are as follows:

Numerical aperture: sin $U=0.5$
Focal length: 100
Thickness of the object covering slab $e_0$: 2.43

| | |
|---|---|
| $R_1=-100.39$ | $e_1=14.08$ |
| $R_2=-114.47$ | $e_2=159.87$ |
| $R_3=-274.34$ | $e_3=190$ |
| $R_4=1,065.8$ | $e_4=13$ |
| $R_5=\infty$ | |

The image drawing is 2,105.0
Diameter of the opaque reflecting portion=65.6
Outer diameter of the semi-transparent zone 101.84
Ratio for central obturation:

$$t=\frac{\sin U_0}{\sin U}=0.27$$

Figure 9:
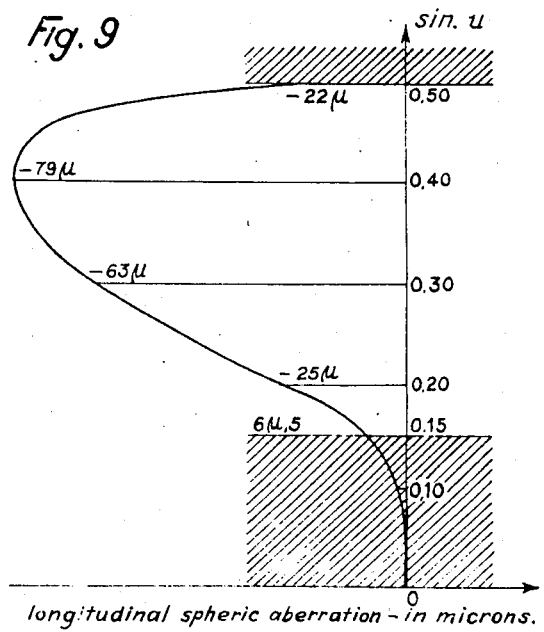
Fig. 9 is the curve for longitudinal spherical aberration corresponding to Fig. 8.

The corresponding aberrations are reproduced in Fig. 9.

The construction according to the present invention makes it possible to preserve all the practical advantages of the mirror-type objectives, such as a very large free working distance, the absence of chromatism in the spectral range from ultra-violet to infra-red, and the possibility of using the objective either "dry" or with immersion by adding a frontal lens concentric with the object. In all cases, the operations effected in accordance with the present invention are precise, easy and rapid. The devices described may also be used both for checking or correcting the adjustments and for facilitating the mounting of the mirror-type objectives considered.

What we claim is:

1. In a mirror type microscope objective having a main optical axis and comprising two concentric, substantially spherical mirrors, one concave with a central aperture forming an annular pupil, and the other convex, means for improving the quality of images of an object point, comprising means for bringing into coincidence the foci of light rays reflected respectively from the outer and inner edges of said annular pupil, and means to superpose the mirror centers on the optical axis of said objective, said convex mirror having a central opaque, reflecting zone limited by the intersection with said convex mirror surface of a cone having the object point as the apex and the edge of the central aperture or the concave mirror as the base, surrounded by an annular semi-reflecting, semi-transparent zone having as its outer limit the cone of rays intersecting said convex mirror after reflection from the outer edge of said concave mirror.

2. A structure according to claim 1, wherein the radii of the concave and convex mirrors are such as to provide the coincidence between the foci of the light rays respectively coming from the external and internal edges of the annular pupil.

3. A structure according to claim 1, wherein said convex mirror is a convex meniscus of small thickness having a central metallic deposit constituting a reflecting surface, and capable of being traversed by all the useful rays issuing from the object, the active surfaces of the convex and concave mirrors being in contact with the ambient atmosphere, the centers of said concave mirror and convex meniscus being coincident, and the radii of the concave mirror and the convex meniscus being such as to provide the coincidence between the foci of the light rays respectively coming from the external and internal edges of the annular pupil.

4. A structure according to claim 1, wherein the radii of the concave and convex mirrors are such as to provide the coincidence between the foci of the light rays respectively coming from the external and internal edges of the annular pupil, a reticle on said main axis, and a converging lens near the central aperture of the concave mirror between said concave mirror and the object.

References Cited in the file of this patent

UNITED STATES PATENTS

| | | |
|---|---|---|
| 1,457,918 | Villiger et al. | June 5, 1923 |
| 2,198,014 | Ott | Apr. 23, 1940 |
| 2,324,449 | Westerlund | July 13, 1943 |
| 2,336,379 | Warmisham | Dec. 7, 1943 |
| 2,378,301 | Kaprelian | June 12, 1945 |
| 2,380,887 | Warmisham | July 31, 1945 |
| 2,385,503 | Glasser | Sept. 25, 1945 |
| 2,466,015 | Ewing | Apr. 5, 1949 |
| 2,490,052 | Harris | Dec. 6, 1949 |
| 2,514,106 | Henroteau | June 6, 1950 |
| 2,520,634 | Grey | Aug. 29, 1950 |
| 2,520,635 | Grey | Aug. 29, 1950 |
| 2,559,799 | Rinia et al. | July 10, 1951 |
| 2,656,761 | Blaisse | Oct. 27, 1953 |
| 2,703,506 | Kelly | Mar. 8, 1955 |